(12) United States Patent
Simpson et al.

(10) Patent No.: US 6,793,449 B1
(45) Date of Patent: Sep. 21, 2004

(54) INTEGRATED RETRACTABLE CARGO TIE-DOWN

(75) Inventors: Tracy Simpson, Ferndale, MI (US); Douglas J. Kroll, Dearborn, MI (US)

(73) Assignee: Leak Corporation, Southfield, MI (US)

( * ) Notice: Subject to any disclaimer, the term of this patent is extended or adjusted under 35 U.S.C. 154(b) by 17 days.

(21) Appl. No.: 10/605,050

(22) Filed: Sep. 4, 2003

(51) Int. Cl.⁷ ................................................ B60P 7/08
(52) U.S. Cl. .................... 410/100; 410/97; 410/102; 410/109; 410/112; 410/116
(58) Field of Search .................... 410/96–97, 100, 410/102, 106, 109, 112, 116; 248/499

(56) References Cited

U.S. PATENT DOCUMENTS

| | | | | |
|---|---|---|---|---|
| 2,756,693 A | * | 7/1956 | Frost | 410/116 |
| 4,842,458 A | | 6/1989 | Carpenter | 410/3 |
| 4,883,208 A | | 11/1989 | Bott | 224/316 |
| 5,772,370 A | | 6/1998 | Moore | 410/100 |
| 6,007,283 A | * | 12/1999 | Labeur | 410/97 |
| 6,099,222 A | | 8/2000 | Moore | 410/100 |
| 6,149,361 A | * | 11/2000 | Schrader | 410/102 |
| 6,158,932 A | * | 12/2000 | Little | 410/103 |
| 6,183,177 B1 | | 2/2001 | Dahlgren | 410/100 |
| 6,280,128 B1 | | 8/2001 | Schrader | 410/97 |
| 6,406,232 B1 | | 6/2002 | Snitker et al. | 410/142 |
| 6,454,501 B1 | | 9/2002 | Parker | 410/149 |
| 6,616,389 B1 | * | 9/2003 | Ament et al. | 410/118 |
| 6,626,623 B2 | * | 9/2003 | DeLay | 410/116 |
| 2001/0009637 A1 | | 7/2001 | Schrader | 410/97 |
| 2002/0131838 A1 | | 9/2002 | Faber et al. | 410/100 |

* cited by examiner

Primary Examiner—Stephen Gordon
(74) Attorney, Agent, or Firm—Bill C. Panagos

(57) ABSTRACT

Disclosed are a retractable tie-down cord assembly and a removable tie-down assembly for securing cargo in the cargo area of a station wagon, utility vehicle, mini van or the like. In one embodiment the tie-down cord assemblies also provides for a tie-down cords to be stored in the interior side wall of the vehicle and the tie-down cord hooks to be stored on the interior side wall of the vehicle and positioned so as to be available as utility hooks within the cargo area.

19 Claims, 4 Drawing Sheets

INTEGRATED RETRACTABLE CARGO TIE-DOWN

BACKGROUND OF INVENTION

1. Field of the Invention

The present invention generally relates to a cargo retentions system, and more particularly to a retractable variable configuration cargo tie-down system using a plurality of tie-down points and a plurality of tie-down cords.

2. Description of the Related Art

Consumers continually seek more efficient, convenient and versatile ways to transport or store contents to be stowed in station wagons, sport utilities, mini vans and other motor vehicles, including passenger vehicles having fold-down rear seats. One disadvantage of the traditional storage space in the above-mentioned motor vehicles is that stowage is freely moveable within the storage compartment, and can be damaged during transport and/or in the event of a sudden stop or impact.

Attempts have been made to answer the above-mentioned needs as well as cargo security in general.

For example, U.S. Pat. No. 4,842,458 issued Jun. 27, 1989 to Carpenter teaches a retractable tie-down strap system for use on commercial trucks for securing loads on, for example, flat bed trailers.

U.S. Pat. No. 4,883,208 issued Nov. 28, 1989 to Bott teaches pop-up tie-down points integral to a deck lid rack.

U.S. Pat. No. 5,772,370 issued Jun. 30, 1998 to Moore teaches a retractable cargo net system for use on a vehicle having a rear opening door.

U.S. Pat. No. 6,099,222 issued Aug. 8, 2000 to Moore teaches another embodiment of a retractable cargo net system for use on a vehicle having a rear opening door.

U.S. Pat. No. 6,183,177 issued Feb. 6, 2000 to Dahlgren teaches a retractable cargo net system capable of forming a coral-like area within a larger cargo area to restrain cargo.

U.S. Pat. No. 6,280,128 issued Aug. 28, 2001 to Schrader teaches a exterior cargo rack having a cargo restraining system incorporated therein.

U.S. Pat. No. 6,406,232 issued Jun. 18, 2002 to Snitker et al. teaches a curtain-like retractable cargo curtain for separating cargo in a freight carrier.

U.S. Pat. No. 6,454,501 issued Sept. 24, 2002 to Parker teaches a cargo securing system for use between spaced walls to containerize separate cargo items.

U.S. Published patent application Ser. No. 2001/0009637 published Jul. 26, 2001 to Schrader teaches another embodiment of an exterior cargo rack having a cargo restraining system incorporated therein.

U.S. Published patent application Ser. No. 2002/0131838 published Sept. 19, 2002 to Faber et al. teaches a stowable cargo restraining barrier assembly for use in commercial freight vehicles.

DISCLOSURE OF THE INVENTION

The present invention provides advantages and alternatives over the prior art by providing a automotive cargo tie-down system that does not require the cargo tie-down system intrude into the cargo area when not in use, but which provides for an easy to use system to secure cargo within the cargo area when needed.

According to a further aspect of the present invention there is provided an integrated retractable automotive cargo tie-down assembly comprising a plurality of spaced apart tie-down cords, each such tie-down cord having a proximal end and a distal end, each of said proximal ends having hooks attached permanently thereto, said proximal ends located in the cargo compartment of an automotive vehicle, and said distal ends attached behind the interior walls of the cargo area of said automotive vehicle, wherein said tie-down cords pass through the interior walls through a plurality of spaced apart openings; said plurality of openings in said interior walls each having a hook retaining channel in commutation therewith to hold said hooks in a utility hook manner against said interior walls when said tie-down cords are in a fully retracted position, and a plurality of spaced apart tie-down bars located on the cargo area floor for securing said hooks on said proximal ends of said tie-down cords, thereby allowing the securing of cargo within the cargo area of an automotive vehicle.

According to yet another aspect of the present invention there is provided an integrated removable automotive cargo tie-down assembly comprising a plurality of spaced apart tie-down cords, each such tie-down cord having a proximal end and a distal end, each of said proximal ends having hooks attached permanently thereto, said proximal ends located in the cargo compartment of an automotive vehicle, and said distal ends attached to the interior walls of the cargo area of said automotive vehicle by a plurality of spaced apart attachment openings; said plurality of tie-down cord distal ends each having a retaining device for attaching said tie-down cord distal ends to said plurality of spaced apart attachment openings, said plurality of attachment openings in said interior walls each having a complimentary tie-down cord distal ends retaining device in commutation therewith to attach said plurality of tie-down cord distal ends to said interior walls, and a plurality of spaced apart tie-down bars located on the cargo area floor and the seat backs of the rear seats for securing said hooks on said proximal ends of said tie-down cords, hereby allowing the securing of cargo within the cargo area of an automotive vehicle.

The present invention thus advantageously provides an advantageous manner of providing cargo area cargo tie-down without undo space required within the storage area when the tie-down system is not needed.

DETAILED DESCRIPTION

Figure 1:
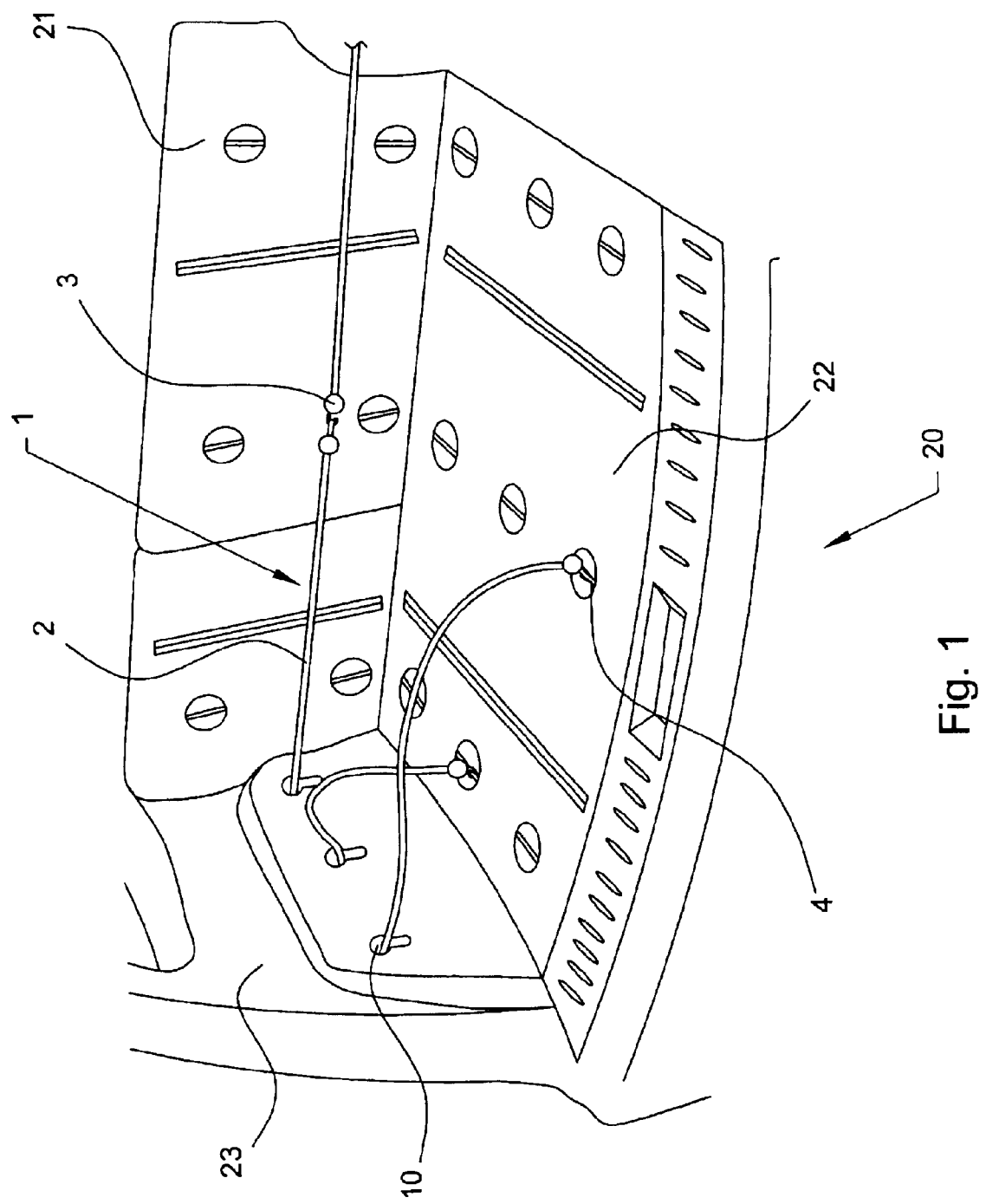
FIG. 1 shows a perspective view of the present invention mounted in an automotive vehicle.

Reference will now be made to the drawings, wherein to the extent possible like reference numerals are utilized to designate like components throughout the various views. Referring to FIG. 1, which presents a perspective view of the cargo area 20 of an automotive vehicle having fold down rear seats 21, a cargo floor 22 and interior side walls 23. Interior side walk 23 have a spaced apart plurality of openings 10 located in desired positions for the retractable tie-down cords 2 to pass through the interior side walls 23. Fold down rear seats 21 and cargo floor 22 have a plurality of spaced apart tie-down assemblies 4 molded therein in desired locations which can be used to secure the retractable tie-down cord assemblies 1 in an extended or cargo securing mode. The retractable tie-down cord assemblies 1 comprise a preferably stretchable tie-down cord 2 having a proximal end accessible within the cargo area and having a hook 3 permanently attached to said proximal end, and a distal end attached behind the interior side walls 23 by a known attachment means (not shown). Further there is shown hooks 7 of hooks 3 secured to tie-down bars 5 of tie-down assemblies 4 as well as to one another as is desirable to secure a given cargo.

Figure 2:
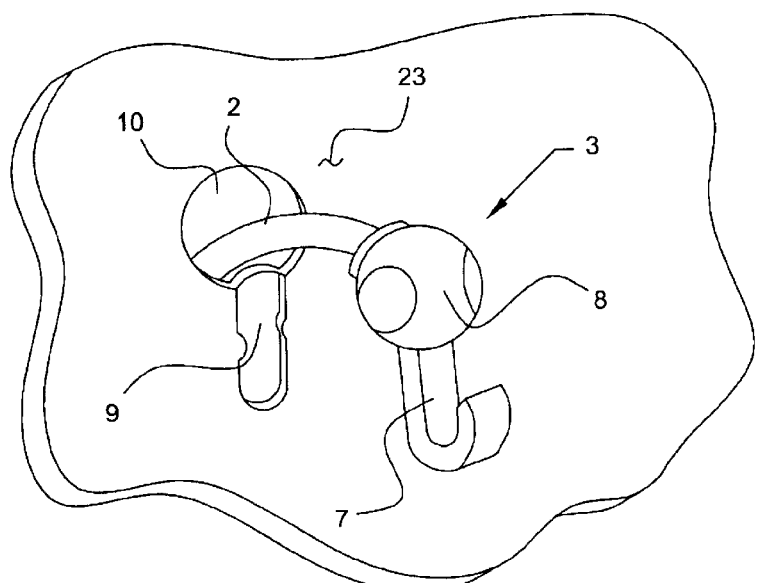
FIG. 2 shows a plan view of the cord, hook end, and interior wall of one embodiment of the hook retaining means of the present invention.

Referring now to FIG. 2, there is shown a plan view of a portion of interior side walls 23 having one of a spaced plurality of openings 10 located therein. The interior side wall also having a retaining channel 9 communicating with each of said spaced plurality of openings 10 and shaped to accept the hook 3 of tie-down cord 2 and hold it in a position that permits said hook 3 to be utilized as a utility hook within said cargo area 20 (FIG. 1). The manner of securing the hook 3 in retaining channel 9 may be by any known means including, for example, a quarter turn locking mechanism, a screw in locking means and twist-locking means. Further there is shown hook 3, partially extended away from opening 10 in interior side wall 23 and comprising a hook portion 7 and head portion 8, said head portion 8 preferably molded to provide easy grasping to remove and insert it into retaining channel 9 as well as allow permanent attachment to the proximal end of tie-down cord 2.

Figure 3:
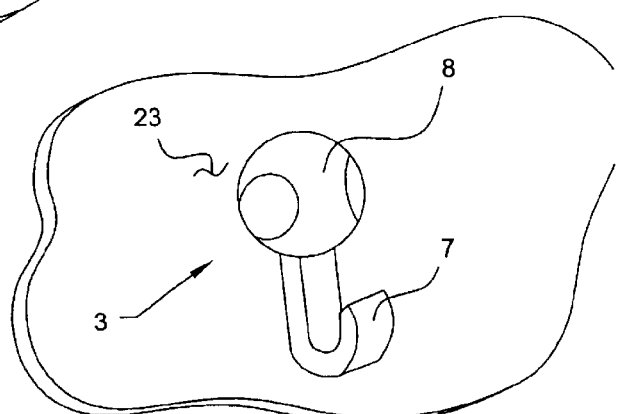
FIG. 3 shows a plan view of the hook end of one embodiment of the retaining means of the present invention mounted in a utility hook mode against an interior wall.

Referring further to FIG. 3, there is shown a plan view of a portion of interior side walls 23 having one of a spaced plurality of openings 10 located therein. The interior side wall also having a retaining channel 9 communicating with each of said spaced plurality of openings 10 shaped to accept the hook 3 of tie-down cord 2 and hold it in position that permits said hook 3 to be utilized as a utility hook within said cargo area 20 (FIG. 1). Further there is shown hook 3 located within the retaining channel 9 and opening 10 in a position that allows hook 3 to be utilized as a utility hook for storing cargo.

Figure 4:
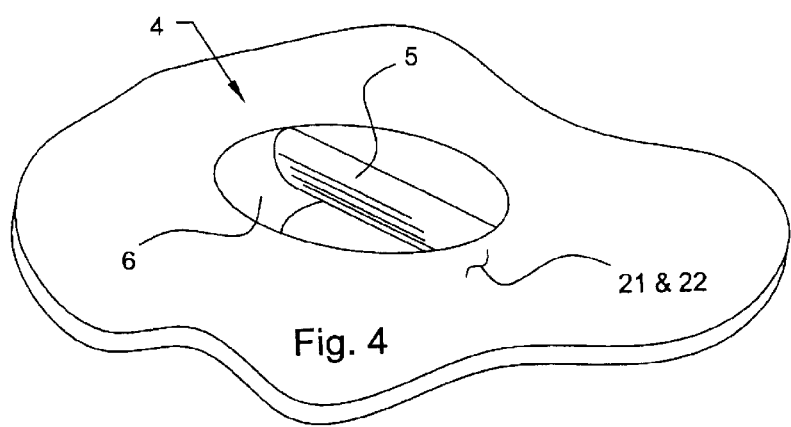
FIG. 4 shows a perspective view of one embodiment of a tie-down of the present invention mounted in an interior floor or wall.

Turning now to FIG. 4, there is shown a plan view of a portion of the back of fold down rear seats 21 and/or a portion of the cargo floor 22 and further showing one of a plurality of spaced apart tie-down assemblies 4 comprising a recess 6 molded into said seat backs or cargo floor and a tie-down bar 5 located within and spanning said recess 6. The size of the recess 6 and size of the tie-down bar 5 being configured to allow the hooks 3 to be secured to said tie-down bars 5 in said recesses 6 of said tie-down assemblies 4.

Figure 5:
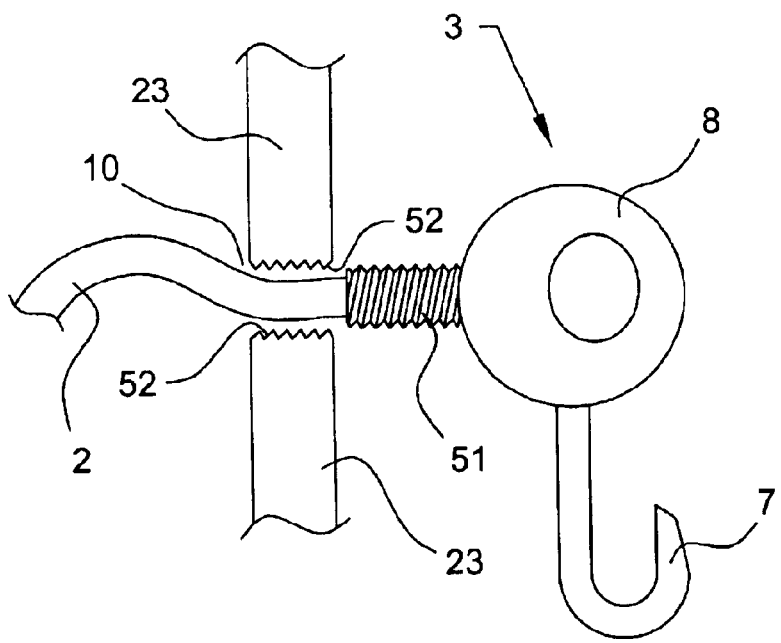
FIG. 5 shows a plan view of one embodiment of the cord, hook end and portion of an interior wall showing a screw type hook retaining means of the present invention.

Referring now to FIG. 5, there is shown a plan view of a portion of the interior side wall 23 having one of a spaced plurality of openings 10 located therein and said opening 10 having a female thread 52 to accept the complimentary male thread 51 of hook 3 of tie-down cord 2 and hold it in position that permits said hook 3 to be utilized as a utility hook within said cargo area 20 (FIG. 1). Further there is shown hook 3 comprising a hook portion 7 and head portion 8, said head portion 8 preferably molded to provide easy grasping to remove and insert it into opening 10 as well as allow permanent attachment to the proximal end of tie-down cord 2.

Figure 6:
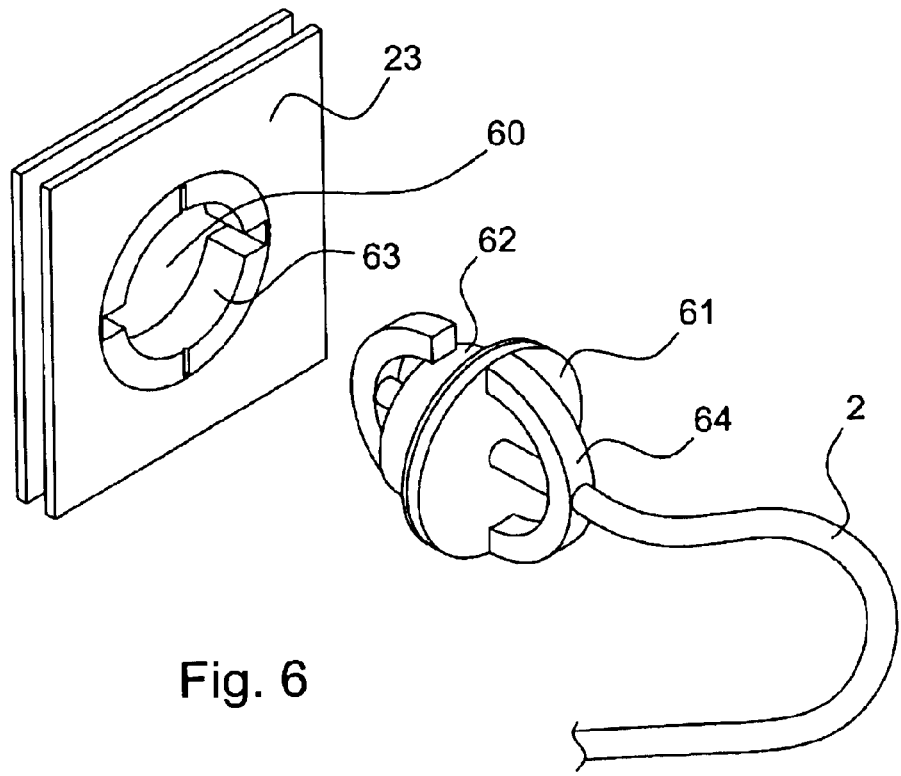
FIG. 6 shows a plan view of one embodiment of a distal cord end mounting means for mounting the cargo cord and hook to the interior of the vehicle cargo space.

Now further referring to FIG. 6, there is shown a plan view of a portion of the interior side wall 23 having one of a spaced plurality of openings 60 having a female quarter turn twist lock device 63 located therein to accept the complimentary male quarter turn twist lock portion 62 on the distal side of distal end locking device 61 permanently mounted on the distal end of cord 2, engagement of said male quarter turn twist lock 62 on the distal side of distal end locking device 61 into said female quarter turn twist lock device 63 allowing the attachment of said cord 2 to the cargo space interior wall. The male quarter turn twist lock device further having a tie-down bar 64 incorporated in the proximal face of distal end locking device 61.

Figure 7:
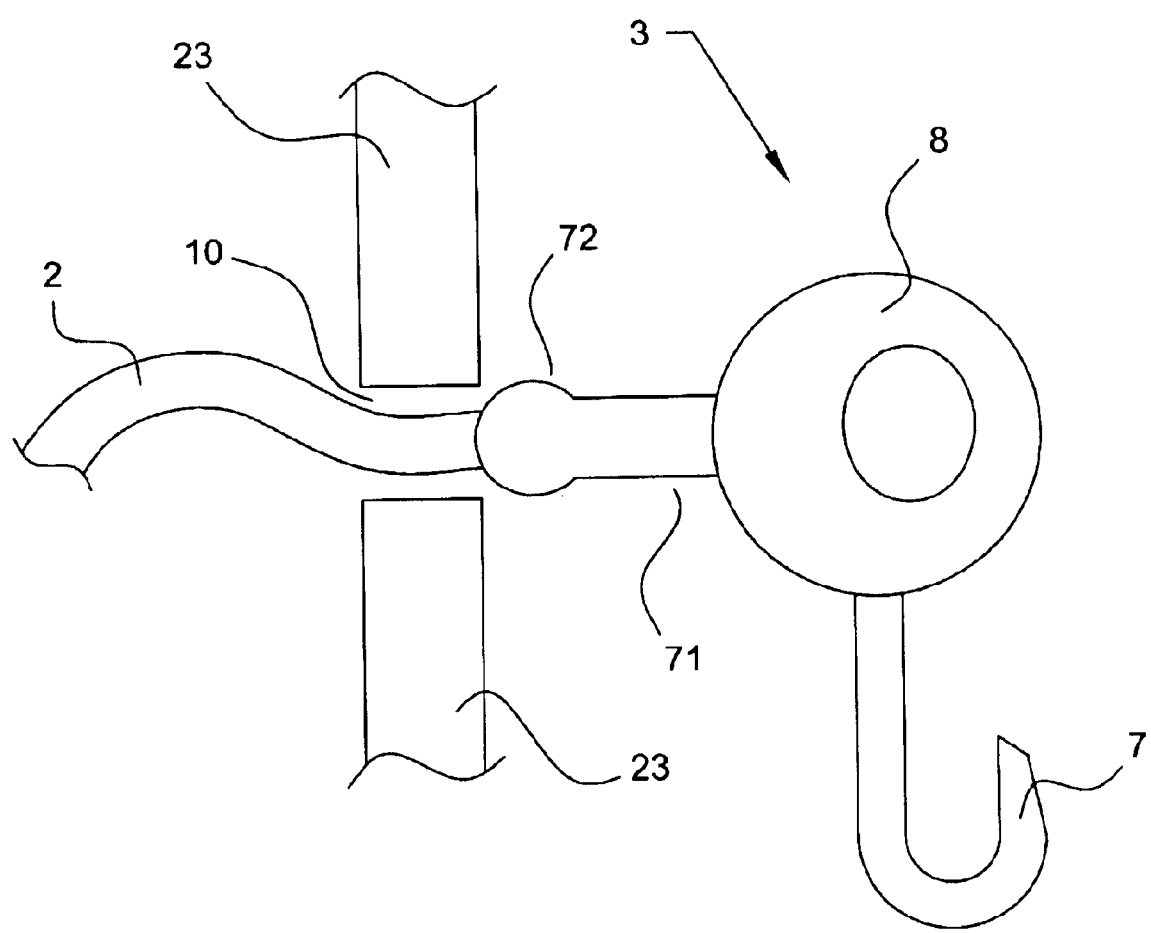
FIG. 7 shows a plan view of one embodiment of the cord, hook end and portion of an interior wall showing a pop-in type hook retaining means of the present invention.

Turning how to FIG. 7, there is shown a plan view of a portion of the interior side wall 23, having one of a spaced plurality of openings 10 located therein. Further there is shown hook 3 comprising a hook portion 7, head portion 8, stem portion 71, and ball end portion 72 said head portion 8 preferably molded to provide easy grasping to remove and insert it into opening 10 as well as allow permanent attachment to the proximal end of tie-down cord 2. The ball end portion 72 being sized to pop into the plurality of openings 10 and the stem portion 71 being of a length that allows the ball to pass through said interior side wall 23 and hold the hook 3 securely against the interior side wail 23 allowing hook 3 to be used as a utility hook.

In practice, cargo (not shown) is place in a desired location within the cargo area 20 and one or more of the tie-down cord assemblies 1 are extended and secured to one or more tie-down assemblies 4 such that the cargo (not shown) is secured within the cargo area 20. When not in use the tie-down cord assemblies 1 are locked in the interior side walls 23 such that the hooks are available as utility hooks and the tie-down cords 2 are stored out of the cargo area 20.

The tie-down cords 2 may comprise any well known tie-down cord material and be of any desired size and length desired. Suitable tie-down cord materials include, for example, natural rubber, synthetic rubbers, elastomers, fabric coated elastic and nylon webbing, presently preferred tie-down cord 2 material is fabric coated elastic. Likewise the hooks 3 may comprise any known suitable material including, for example, thermoset resins, thermoplastic resins, aluminum and steel, presently preferred hook materials are thermoset and thermoplastic resins. The tie-down bars 5 may comprise any suitable known material including, for example, thermoset resins, thermoplastic resins, aluminum and steel, presently preferred hook materials are thermoset and thermoplastic resins.

The tie-down cords 2 may be stored by simply pushing them through openings 10 or retractor means well known in the art may be used to pull the unsecured tie-down cords through openings 10 for example. In the of stretchable tie-down cords 2 the normal return to unstretched condition can be used to pull the tie-down cords 2 through openings 10. The tie-down cords distal ends may be secured to the vehicle frame members, vehicle panels, or to the back surface of the cargo area defining interior panels. Suitable securing means are well known in the art and include, for example, screws, dips, and the like.

Although the preferred embodiments of the present invention have been disclosed, various changes, and modifications may be made without departing from the scope of the invention as set forth in the appended claims.

What is claimed is:

1. An integrated retractable automotive cargo tie-down assembly comprising:
   a) a plurality of spaced apart tie-down cords, each such tie-down cord having a proximal end and a distal end, each of said proximal ends having hooks attached permanently thereto, said proximal ends located in a cargo compartment of an automotive vehicle, and said distal ends attached behind interior walls of a cargo area of said automotive vehicle, wherein said tie-dawn cords pass through the interior walls through a plurality of spaced apart openings;
   b) said plurality of openings in said interior walls each having a hook retaining channel in commutation therewith to hold said hooks in a utility hook manner against said interior walls when said tie-down cords are in a fully retracted position, and
   c) a plurality of spaced apart tie-down bars located on a cargo area floor for securing said hooks on said proximal ends of said tie-down cords,
thereby allowing the securing of cargo within the cargo area of an automotive vehicle.

2. The integrated retractable cargo tie-down assembly as claimed in claim 1 wherein, said tie-down cords comprise a length when relaxed which causes the hooks to be positioned in said channels in the interior walls and when said tie-down cords are fully extended reach substantially about half way across the width of said cargo area.

3. The integrated retractable cargo tie-down assembly as claimed in claim 1 wherein, said hooks comprise a hook portion and a head having a configuration allowing easy grasping of said hooks.

4. The integrated retractable cargo tie-dawn assembly as claimed in claim 1 wherein, said tie-down bars arc recessed below a cargo floor upper surface.

5. The integrated retractable cargo tie-down assembly as claimed in claim 1 wherein, said tie-down cords comprise bungee cords.

6. The integrated retractable cargo tie-down assembly as claimed in claim 1 wherein, said hooks have a stem and ball end on the back to allow the hooks to pop into and be secured to the interior walls.

7. The integrated retractable cargo tie-down assembly as claimed in claim 1 wherein, said hooks have a male screw thread compatible with a complimentary female screw thread in each of said plurality of openings for locking said hooks in a utility hook position.

8. The integrated retractable cargo tie-down assembly as claimed in claim 1 wherein, said tie-down cords distal ends are permanently attached.

9. The integrated retractable cargo tie-down assembly as claimed in claim 1 wherein, said tie-down cords distal ends are removably attached.

10. The integrated retractable cargo tie-down assembly as claimed in claim 1 wherein, said tie-down cords comprise nylon webbing attached at their distal ends to a mechanical retractor means.

11. An integrated removable automotive cargo tie-down assembly comprising:
    a) a plurality of spaced apart tie-down cords, each such tie-down cord having a proximal end and a distal end, each of said proximal ends having hooks attached permanently thereto, said proximal ends located in a cargo compartment of an automotive vehicle, and said distal ends attached to interior walls of a cargo area of said automotive vehicle by a plurality of spaced apart attachment openings;
    b) said plurality of tie-down cord distal ends each having a retaining device for attaching said tie-down cord distal ends to said plurality of spaced apart attachment openings,
    c) said plurality of attachment openings in said interior walls each having a complimentary tie-down cord distal ends retaining device in commutation therewith to attach said plurality of tie-down cord distal ends to said interior walls, and
    d) a plurality of spaced apart tie-down bars located on cargo area floor and seat backs of rear seats for securing said hooks on said proximal ends of said tie-down cords,
thereby allowing the securing of cargo within the cargo area floor of an automotive vehicle.

12. The integrated removable cargo tie-dawn assembly as claimed in claim 11 wherein, said tie-down cords comprises a length when said tie-down cords are fully extended that reaches substantially about half way across the width of said cargo area.

13. The integrated removable cargo tie-down assembly as claimed in claim 11 wherein, said hooks comprise a hook portion and a head having a configuration allowing easy grasping of said hooks.

14. The integrated removable cargo tie-down assembly as claimed in claim 11 wherein, said tie-down bars are recessed below a cargo floor upper surface and recessed below a rear seat back surface.

15. The integrated removable cargo tie-down assembly as claimed in claim 11 wherein, said tie-down cords comprise bungee cords.

16. The integrated removable cargo tie-down assembly as claimed in claim 11 wherein, said hooks have a stem and ball end on the back to allow the hooks to pop into and be secured to the interior walls.

17. The integrated retractable cargo tie-down assembly as claimed in claim 11 wherein, said tie-down cords are removable when not in use.

18. The integrated removable cargo tie-down assembly as claimed in claim 11 wherein, said tie-down cords may be mounted in any of said plurality of spaced apart attachment openings.

19. The integrated removable cargo tie-down assembly as claimed in claim 11 wherein, said plurality of tie-down curd distal end retaining devices each further have a tie-down hook attaching device.

* * * * *